United States Patent [19]

Etzel

[11] Patent Number: 4,584,792
[45] Date of Patent: Apr. 29, 1986

[54] PLANT SUPPORT

[76] Inventor: Leland E. Etzel, 916 Garfield Dr., Carpentersville, Ill. 60110

[21] Appl. No.: 624,534

[22] Filed: Jun. 25, 1984

[51] Int. Cl.⁴ .............................................. A01G 9/12
[52] U.S. Cl. .......................................... 47/70; 47/47; 47/44
[58] Field of Search .......................... 47/47, 44, 33, 70; D25/75, 76; 52/157; 405/244; 248/200.1

[56] References Cited

U.S. PATENT DOCUMENTS

| 603,754 | 5/1898 | Baldwin | 47/47 |
| 888,917 | 5/1908 | Lucas | 52/157 |
| 1,627,495 | 5/1927 | Effley | 47/47 |
| 1,916,305 | 7/1933 | Esselen | 47/47 |
| 1,976,264 | 10/1934 | Miner et al. | 52/165 |
| 2,893,169 | 7/1959 | Shepherd | 47/47 |
| 2,903,823 | 9/1959 | Westford | 47/47 |
| 3,345,774 | 10/1967 | Delbuqaet | 47/44 |
| 3,354,580 | 11/1967 | Amortegui | 47/47 |
| 3,515,373 | 6/1970 | Abbe | 47/33 |
| 4,048,752 | 9/1977 | Anderson | 47/47 |

FOREIGN PATENT DOCUMENTS

| 1957603 | 11/1969 | Fed. Rep. of Germany | 47/47 |
| 0089623 | 7/1981 | Japan | 405/244 |

Primary Examiner—Robert A. Hafer
Assistant Examiner—Bradley M. Lewis
Attorney, Agent, or Firm—Mathew R. P. Perrone, Jr.

[57] ABSTRACT

A plant support having a decorative end piece and a base piece oppositely disposed therefrom with intermediate sections secured therebetween as desired provides an expandable plant support. Between each junction of the intermediate sections and the base and decorative sections, is provided a plant tie holder. On the base piece is mounted at least one base cross member for support.

20 Claims, 4 Drawing Figures

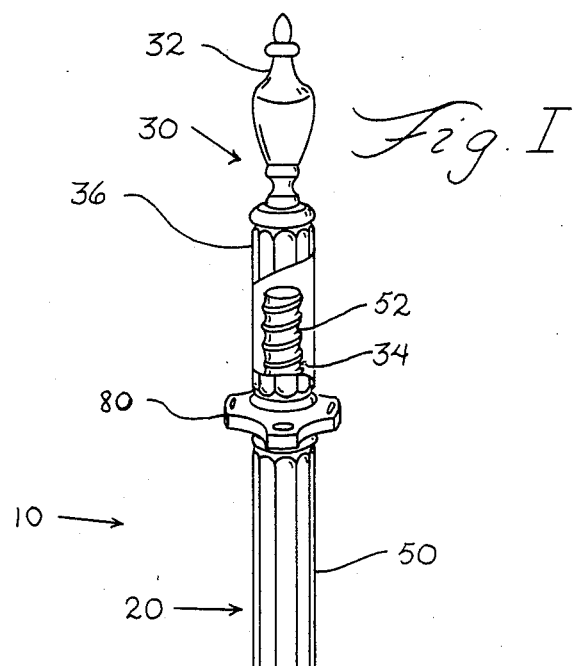
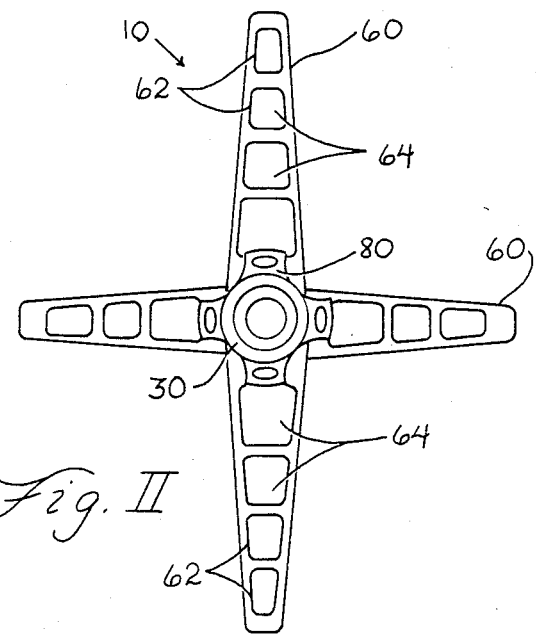
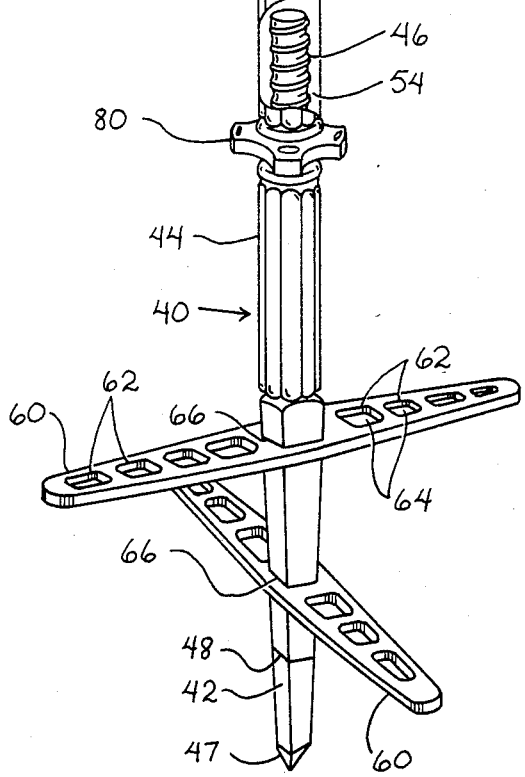
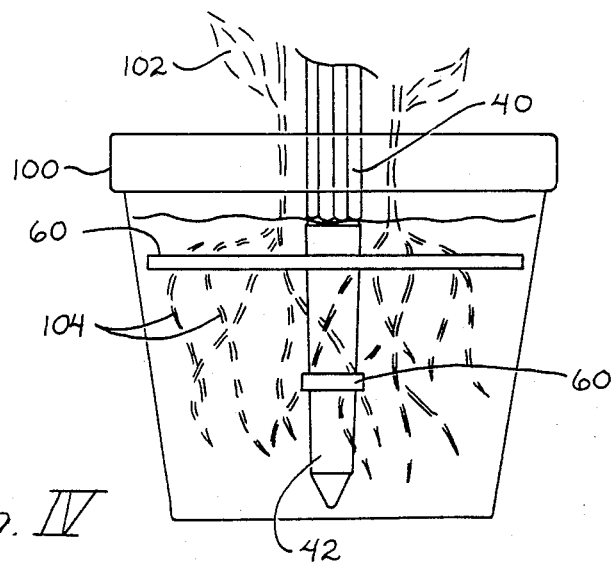

PLANT SUPPORT

BACKGROUND OF THE INVENTION

This invention relates to a plant support, and more particularly to a plant support having a base support in combination with an adjustable height mechanism and a tie support for securing a plant to the support.

Plants serve many important functions in today's life. The most important function of a plant is to provide food. Secondarily, but important aesthetic importance are the decorative aspects of plants.

One requirement of either a food plant or an aesthetically pleasing plant can be that the plants stand up properly. For an aesthetic plant, the appropriate plant stance enhances appearance. For a food plant, the appropriate plant stance can provide additional food from an individual plant.

Many different devices are known for assisting plants in their standing features. If the device is simple to install, it may lack the necessary strength or stability to support the standing plant. If the device is difficult to install, it may lack the capability for being installed adjacent to a plant in order to support that plant.

Also, supports may not necessarily be decorative. This is especially important for the aesthetic appearance of the decorative plants. If the support is functional as opposed to being decorative, the appearance of the support can detract from even the most aesthetically pleasing plant. It thus becomes desirable to provide a strong support; which is simple to install, decorative, and capable of matching the function of the food or decorative plant it is designed to support.

Another problem with plant support is that as the plants grow, the supports become too short to contend with the plant growth. In this way, the plant supports lose their desired function and fail to achieve the purpose thereof. This can be severely damaging to either aesthetic appearance of the plant or food production from the plant, especially if the plant needs further support as growth continues.

A further problem as the plant grows taller comes with the necessarily increased length of the support. As the plant support gets longer to support the taller plant, the support itself can need buttressing. Such buttressing must occur while preserving the decorative aspects of the plant support.

It therefore becomes desirable to provide a plant support which is easy to install, provides strong support for the plant and is at the same time decorative without destroying the appearance of the plant.

SUMMARY OF THE INVENTION

Therefore, it is an object of this invention to provide a plant support.

A further of this invention is to provide a stable plant support.

Still a further object of this invention is to provide a decorative plant support.

Yet a further object of this invention is to provide a strong plant support.

Also an object of this invention is to provide a plant support having an increasable length.

Another object of this invention is to provide a plant support having maintain strong support with an increase in length.

These and other objects of the invention (which other objects become clear when considering the specification and claims as a whole) are met by providing a plant support having a decorative top section and a base section oppositely disposed therefrom with intermediate sections therebetween as desired. Between each junction of the intermediate sections and the base and decorative sections, is provided a plant tie holder. On the base section is mounted at least one base cross member for support.

BRIEF DESCRIPTION OF DRAWINGS

FIG. I is a perspective view of plant support 10 of the invention.

FIG. II is a top view of plant support 10 as shown in FIG. I.

FIG. III is a perspective view of plant tie holder 80 of the invention.

FIG. IV is a partial cutaway view of plant support 10 in use in pot 100.

Throughout the figures of the Drawings, where the same part appears in more than one figure, the same number is given thereto.

DESCRIPTION OF PREFERRED EMBODIMENTS

A plant support includes a tapered or pointed base section and a decorative top section being interconnected. The decorative top section and the base section may be separated by intermediate sections which may be optionally and removably inserted therebetween. Between each section is inserted a plant tie support. Cross pieces on the base of the plant support improve the support strength—whether the plant support is used in a field, a garden, a pot, or similar support situation.

Referring now to FIG. I, the plant support 10 of this invention includes a multi-sectioned pole 20 having at least two interconnected pieces, a plant tie support 80 and at least one base cross member 60. Decorative section 30 appears on the top of multi-sectioned pole 20. Base section 40 is designed to be inserted into the ground. As many of intermediate section 50 as desired may be used to adjust the height of the plant support 10, and more specifically multi-sectioned pole 20, as the plant grows.

Decorative section 30 is a filial pole and has a knobbed end 32 at one end of multi-sectioned pole 20. Knobbed end 32 may be any suitable decoration. On decorative section 30 oppositely disposed from knobbed end 32 is threaded receiver 34. Threaded receiver 34 receives either base section 40 or intermediate section 50. Between threaded receiver 34 and knobbed end 32 is top fluted section 36 to correspond with the exterior decorations on base section 40 or intermediate section 50.

Base section 40 has a pointed section 42, which includes as a lower end thereof and is capable of being inserted into the ground or a flower pot 100 (shown in FIG. IV). Pointed section 42 is generally pyramidal in shape. Oppositely disposed from pointed section 42 is base fluted section 44. Base fluted section 44 has an appearance similar to that of top fluted section 36. On base fluted section 44 oppositely disposed from pointed section 42 is base screw 46. Base screw 46 may fit into threaded receiver 34 or other similar apertures. Pointed section 42 tapers to a point 47 and has a square cross-section 48.

Intermediate section 50 is an extender pole and is fluted to correspond to top fluted section 36 and base fluted section 44. Thus intermediate section 50 is designed to fit between base section 40 and decorative section 30. To that end, intermediate section 50 has an intermediate screw end 52 on one end thereof, and an intermediate screw receiving end 54 oppositely disposed from intermediate screw end 52 on the other end thereof.

Intermediate screw end 52 can be in threaded relation with threaded receiver 34 of decorative section 30, or another intermediate screw receiving end 54 on a second intermediate section 50 (not shown) which can be used to even further expand multi-sectioned pole 20. Also clear is that the fluted design may be replaced with any other desirable design.

When considering FIG. II, in use plant support 10 has a base cross member 60 slideably mounted on pointed section 42 of base 40. Cross member 60 serves as a soil stabilizer in that it is buried in the soil 106 in pot 100 or below the surface of the ground and stabilizes plant 102. Cross member 60 is a generally flat, elongated piece of material tapered from the central portion toward the ends thereof with a plurality of apertures 62 therein. Apertures 62 include a plurality of root receivers 64 laterally disposed from a centrally-located point receiver 66. The cross member 60 slides over the base section 40 at point receiver 66. Because the square cross-section 48 of pointed section 42 is tapered to point 47 and point receiver 66 has a appropriate area, cross member 60 slides over pointed section 42, but cannot reach fluted section 44.

As the plant 102 grows in pot 100 (as shown in FIG. IV), the roots 104 reach down through the apertures used as root receivers 64. Root receivers 64 have less area than point receiver 66 due to the tapering of cross member 60. More than one cross-member 60 may also be used provide support to the multi-section pole 20. Two cross members 60 are shown in FIG. I and FIG. IV as is preferred. In this fashion, strong support is achieved for the multi-section pole 20. This strong support is strengthened by the roots growing through the root receivers 64 in the cross members 60 so that as the plant grows taller, the support for holding the plant in an upright position is concurrently strengthened.

Considering FIG. I and FIG. III, between each of decorative section 30, base section 40, or intermediate section 50 is inserted a plant tie support 80. Plant tie support 80 has a screw receiver 82 centrally located therein. Screw receiver 82 may receive screw 46 or screw end 52, while screw end 52 or screw 46 may then be placed in threaded relation with intermediate screw receiver 54 or threaded receiver 34. In this fashion plant tie support 80 is secured to pole 20.

Plant tie holder 80 is generally square in shape and has a plant point 84 at corner of the square. Within each of the four plant points 84 is a tie aperture 86 tieing the plant to the plant tie holder 80. Thus, plant tie holder 80 has four outwardly extending lobes with each of the lobes serving as plant tie point 84. The tie aperture 86 provides the attachment for the plant.

The plant support 10 is buried at base section next to the plant 102. One tie support 80 is inserted between the base section 40 and the decorative section 30; and the plant 102 is tied securely to the plant support 10 without interfering with the growth. As the plant 102 grows, the decorative section 30 is temporarily removed, and one or more intermediate sections 50—with a plant tie holder 80 for each intermediate section 50—are inserted therebetween. The intermediate sections 50, and decorative section 30, and base section 40 are in threaded relation with each other.

Each intermediate section 50 has a female receiver at one end (intermediate screw receiver 52) and a male threaded device at the other end (intermediate screw end 52)—oppositely disposed from the female receiver. The base cross members 60 slide over point 47 onto base section 40. In this fashion, the desired results are achieved with great rapidity and desirability.

Decorative section 30 is shown as having a threaded receiver 34. It may also have a screw end like intermediate screw end 52. In a like fashion, base section 40 has a screw 46. It may also have a female receiver like intermediate screw receiver 52. Intermediate section 50 may also have two female receivers or two male threaded devices instead of one of each. Such adjustments are well within the skill of the person having ordinary skill in this art—because of this disclosure.

It is also clear that male threaded device and female receiver may be replaced with other attaching means. Likewise, the fluted design may replaced. The shown attachment and design are preferred.

Because of this disclosure and solely because of this disclosure, various modifications to plant support 10 can become clear to those having ordinary skill in the art. Such modifications are clearly covered hereby.

What is claimed and sought to be secured by Letters Patent of the United States is:

1. A removable plant support suitable for supporting a plant by securing said plant thereto, said plant support having an increasable length including a multi-sectioned pole having at least two interconnected pieces, at least one base section included in said two interconnected pieces, a plant tie support, and at least one base cross member, wherein:
   a. said pieces of said multi-sectioned pole include a decorative top section for defining the top of said plant support and a base section having a lower end to be inserted into the ground oppositely disposed from said decorative top, said lower end tapering from its top section;
   b. said plant tie holder mounted between each of said sections;
   c. said lower end bearing at least one elongated, base cross member slideably mounted on said base section for support in order to provide below ground support for said plant;
   d. said at least one elongated base cross member and at least a portion of said lower end bearing being beneath the soil; and
   e. said at least one base cross member including a plurality of root receiver apertures; said root receiver apertures serving to receive roots of said plant in order to strengthen support for said plant—whereby, when said base section is removed, said at least one cross member will remain beneath the soil to fixedly hold the roots of said plant.

2. The plant support of claim 1, wherein said multi-sectioned pole has a centrally situated decorative portion.

3. The plant support of claim 2, wherein said decorative top section provides a fillial end at one end thereof for said top of said plant and part of said centrally situated decorative portion oppositely disposed from said fillial end.

4. The plant support of claim 3, wherein an intermediate section forms part of said centrally situated decorative portion.

5. The plant support of claim 4, wherein more than one of said intermediate sections is used in said multi-sectioned pole.

6. The plant support of claim 4, wherein said multi-sectioned pole has a plant tie holder between each of said pieces.

7. The plant support of claim 6, wherein said centrally situated decorative portion is fluted.

8. The plant support of claim 7, wherein said pieces of said multi-sectioned pole further include more than one intermediate section between said base section and said decorative end section.

9. The plant support of claim 8, wherein said decorative top section has oppositely disposed from said fillial end a threaded receiver for receiving one of said pieces.

10. The plant support of claim 9, wherein said multi-sectioned pole has a plant tie holder between each of said pieces.

11. The plant support of claim 10, wherein said centrally situated decorative portion is fluted.

12. The plant support of claim 11, said base section a pointed section capable of being inserted into the ground or a flower pot, and a base fluted section oppositely disposed from said pointed section, said base fluted section forming a part of said centrally situated decorative portion.

13. The plant support of claim 12, said base section has a pointed section and a base fluted section as part of said centrally situated decorative portion oppositely disposed from said pointed section.

14. The plant support of claim 13 wherein said pointed section is pyramidal in shape.

15. The plant support of claim 14 wherein said base fluted section includes a base screw for securing said base section to said other piece.

16. The plant support of claim 15 wherein said intermediate section serves as an extender pole and is fluted to correspond to said centrally situated decorative portion.

17. The plant support of claim 16 wherein said intermediate section has an intermediate screw end on one end thereof, and an intermediate screw receiving end oppositely disposed from said intermediate screw end for attaching to said other pieces.

18. The plant support of claim 17 wherein said base cross member a generally flat, elongated piece of material tapered from the central portion toward the ends thereof with a plurality of root receiver apertures laterally disposed from a centrally-located point receiver, said cross member is slideably mounted on said pointed section at said point receiver.

19. The plant support of claim 18 wherein at least two of said base cross members are used.

20. The plant support of claim 19 wherein:
a. said plant tie support having a screw receiving aperture centrally located therein to receive said intermediate screw end;
b. said plant tie support has four outwardly extending lobes and a plant attachment means at each of said lobes; and
c. a tie aperture defined within each of said outwardly extending lobes.

* * * * *